United States Patent [19]

Maeda et al.

[11] Patent Number: 4,525,749
[45] Date of Patent: Jun. 25, 1985

[54] METHOD AND APPARATUS FOR SCANNING AN OBJECT BY USING THE LIGHT

[75] Inventors: Kiyoshi Maeda; Masafumi Kawatani, both of Takatsuki, Japan

[73] Assignee: Dainippon Screen Seizo Kabushiki Kaisha, Kyoto, Japan

[21] Appl. No.: 535,905

[22] Filed: Sep. 26, 1983

Related U.S. Application Data

[63] Continuation of Ser. No. 280,534, Jul. 6, 1981, abandoned.

[51] Int. Cl.³ .......................... H04N 1/06; H04N 1/20
[52] U.S. Cl. ..................................... 358/290; 358/292
[58] Field of Search ............... 358/285, 289, 290, 292; 350/6.8, 6.91

[56] References Cited

U.S. PATENT DOCUMENTS 3,816,652 6/1974 Barnett ................................. 358/292
3,876,829 4/1975 Schrieber ............................ 358/285
4,206,482 6/1980 Delanalette et al. ............... 358/290

FOREIGN PATENT DOCUMENTS 54-160117 12/1979 Japan .................................. 358/285

Primary Examiner—Joseph A. Orsino, Jr.
Attorney, Agent, or Firm—Marvin E. Jacobs

[57] ABSTRACT

A method and apparatus for scanning an object such as a photosensitive material by using the light beam or beams for use in a picture reproducing machine such as laser reproducing apparatus for plate making are disclosed. An object mounted to a surface of an object holder having a cylinder-like curvature is scanned by a light beam which is incident to a rotary mirror arranged on a rotating axis parallel with the holder's central axis, from the direction perpendicular thereto, and is reflected by the rotary mirror onto the object in the directions of holder's curvature and holder's central axis by rotating the rotary mirror around the rotating axis and moving the light beam in the direction of the rotating axis of the rotary mirror by using a light beam head in relation to the holder.

7 Claims, 8 Drawing Figures

FIG. 7

| | | FIRST CYCLE | | | | SECOND CYCLE | | | | THIRD CYCLE | | |
|---|---|---|---|---|---|---|---|---|---|---|---|---|
| SCANNING LINE OF PICTURE | | ↗L1 | ↗L2 | ↗L3 | ↗L4 | ↗L5 | ↗L6 | ↗L7 | ↗L8 | ↗L9 | ↗L10 | ↗L11 |
| PERPENDIC-ULAR (H) POSITION | I | B1 | | B2 | | B1 | | B2 | | B1 | | B2 |
| | II | | B1 | | B2 | B1 | | B2 | | B1 | | |
| | III | | B1 | | B2 | | B1 | | B2 | | B1 | |
| | IV | | | | B1 | | B2 | | B1 | | B2 | |
| SCANNING LINE OF PHOTO-SENSITIVE MATERIAL | 42' | ↗L1 I·b1' | | ↗L3 I·b2' | ↗L4 IV·b1" | ↗L5 I·b1' | ↗L6 IV·b2" | ↗L7 I·b2' | ↗L8 IV·b1" | ↗L9 I·b1' | ↗L10 IV·b2" | ↗L11 I·b2' |
| | 42" | II·b1' | III·b1" | II·b2' | III·b2" | II·b1' | III·b1" | II·b2' | III·b2" | II·b1' | III·b1" | |
| | | ↙L2 | ↙L3 | ↙L4 | ↙L5 | ↙L6 | ↙L7 | ↙L8 | ↙L9 | ↙L10 | ↙L11 | |

FIG. 8

| | | FIRST CYCLE | | | | SECOND CYCLE | | | | THIRD CYCLE | | |
|---|---|---|---|---|---|---|---|---|---|---|---|---|
| SCANNING LINE OF PICTURE | | ↗L1 | ↗L2 | ↗L3 | ↗L4 | ↗L5 | ↗L6 | ↗L7 | ↗L8 | ↗L9 | ↗L10 | ↗L11 |
| PERPENDIC-ULAR (H) POSITION | I | B̶1̶ | B2 | B3 | | B̶1̶ | B2 | B3 | | B̶1̶ | B2 | B3 |
| | II | | B1 | B2 | B̶3̶ | | B1 | B2 | B̶3̶ | | B1 | B2 |
| | III | | B̶1̶ | B2 | B3 | | B̶1̶ | B2 | B3 | | B̶1̶ | |
| | IV | | | | B1 | B2 | B̶3̶ | | B1 | B2 | B̶3̶ | |
| SCANNING LINE OF PHOTO-SENSITIVE MATERIAL | 42' | ↗L2 I·b2' | ↗L3 I·b3' | ↗L4 IV·b1" | ↗L5 IV·b2" | ↗L6 I·b2' | ↗L7 I·b3' | ↗L8 IV·b1" | ↗L9 IV·b2" | ↗L10 I·b2' | ↗L11 I·b3' | |
| | 42" | II·b1' | II·b2' | III·b1" | III·b2" III·b3" | II·b1' | II·b2' | III·b1" III·b2" | III·b3" | II·b1' | II·b2' | |
| | | ↙L2 | ↙L3 | ↙L4 | ↙L5 | ↙L6 | ↙L7 | ↙L8 | ↙L9 | ↙L10 | ↙L11 | |

METHOD AND APPARATUS FOR SCANNING AN OBJECT BY USING THE LIGHT

This is a continuation of application Ser. No. 280,534, filed July 6, 1981 now abandoned.

BACKGROUND OF THE INVENTION

This invention relates to a method and apparatus for scanning an object by using the light, for use in a picture reproducing machine such as a color scanner and a laser reproducing apparatus for plate making.

In a conventional picture reproducing machine such as a color scanner and a laser reproducing apparatus for plate making, the scanning of a picture image is carried out for recording it on a photosensitive material by a flat or cylindrical scanning method wherein the photosensitive material is mounted to a flat or cylindrical surface. The cylindrical scanning method is less operative than the flat scanning method, for example, the mount or the demount of the photosensitive material is rather troublesome. However, since the angular speed of scanning is uniform, the reproducibility of the picture is accurate and thus no particular correction lens system is required. Accordingly, its optical system is simple and its producing cost is low.

In the cylindrical scanning method for recording the picture image on the photosensitive material, an outer cylindrical surface scanning method or an inner cylindrical surface scanning method is employed, the former being largely used in the color scanner and the color facsimile for plate making. In the former method, since the cylinder on which the photosensitive material is mounted is rotated, the scanning speed is restricted to be a low speed, and, when the scanning is forcibly carried out at a high speed, the material mounted to the outer surface of the cylinder is often flown off by the centrifugal force.

Meanwhile, in a conventional inner cylindrical surface scanning method, the photosensitive material mounted to the inner cylindrical surface of the cylinder fixed is scanned by a light beam reflected by a cutoff mirror having a reflecting surface at an angle 45° with respect to a central axis of the cylinder or a pyramid mirror having a plurality of such reflecting surfaces at the angle 45°, while the cutoff mirror or the pyramid mirror is rotated, it reflecting the light beam incident thereto from the direction along the central axis of the cylinder. In this embodiment, because there is no need to rotate the cylinder, which is different from the outer cylindrical surface scanning method, the scanning speed can greatly be increased, whereas it is difficult to attach the material to be scanned onto the inner cylindrical surface of the cylinder. When the photosensitive material is scanned by a plurality of light beams in the same time, each light beam should be incident on the material at an angle perpendicular to the scanning direction, and in order to obtain such a condition a correction optical system is required. Therefore, it difficult to realize this method.

SUMMARY OF THE INVENTION

It is an object of the present invention to provide a method for scanning an object by using the light for use in a picture reproducing machine such as a color scanner and a laser reproducing apparatus for plate making, free from the aforementioned defects, which is very much effective and operative, has a simple and compact construction, and which does not require a correction optical system.

It is another object of the present invention to provide an apparatus for scanning an object by using the light for use in a picture reproducing machine such as a color scanner and a laser reproducing apparatus for plate making, free from the aforementioned defects, which is very much effective and operative, has a simple and compact construction, and which does not require a correction optical system.

According to the present invention there is provided A method for scanning an object by using the light, for use in a picture reproducing machine, wherein an object mounted to a surface of an object holder having a cylinder-like curvature is scanned by a light beam which is incident to a rotary mirror arranged on a rotating axis parallel with a holder's central axis, from the direction perpendicular thereto, and is reflected by the rotary mirror onto the object, in the directions of holder's curvature and holder's central axis by rotating the rotary mirror around the rotating axis and moving the light beam in the direction of the rotating axis in relation to the holder in the same time.

According to the present invention there is also provided an apparatus for scanning an object by using the light, for use in a picture reproducing machine, comprising (a) an object holder having a cylinder-like curvature on which an object to be scanned is mounted, (b) a rotary mirror which is rotatably arranged on a rotating axis parallel with a holder's central axis and is adapted to be rotated around the rotating axis, its reflecting surface being parallel with the holder's central axis, and (c) a light beam head which passes a light beam so that it may be incident to the rotary mirror perpendicular to the holder's central axis and which is adapted to be moved in the direction of the holder's central axis.

BRIEF DESCRIPTION OF DRAWINGS

In order that the present invention may be better understood preferred embodiments thereof will now be described with reference to the accompanying drawings, in which:

FIG. 7 shows relations among scanning lines of a picture, positions of a pickup head and a picture image recorded on a photosensitive material in the third embodiment of the present invention; and FIG. 8 shows relations among scanning lines of a picture, positions of a pickup head and a picture image recorded on a photosensitive material in the fourth embodiment of the present invention.

DESCRIPTION OF PREFERRED EMBODIMENTS

Figure 1:
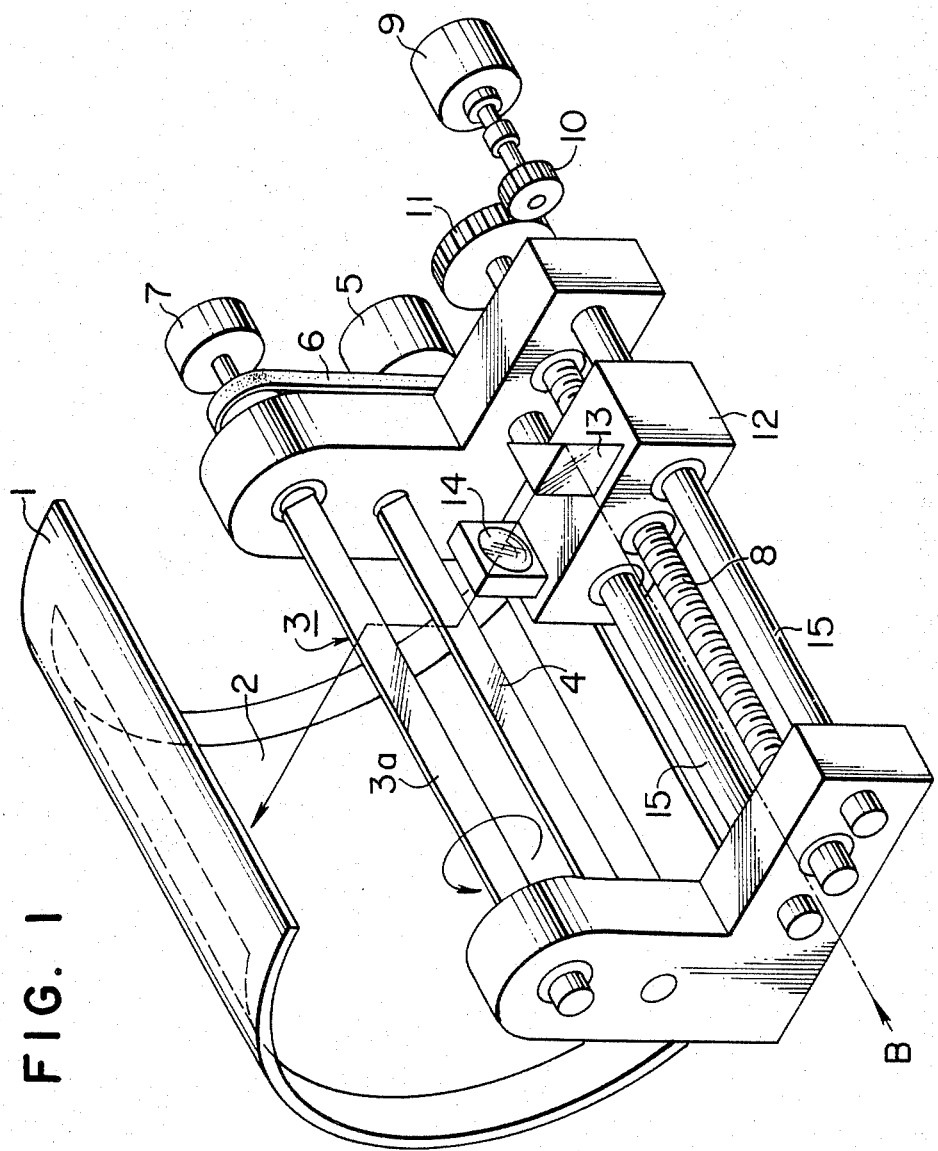
FIG. 1 is a fragmentary perspective view of the first embodiment of an apparatus according to the present invention.

Referring now to the drawings there is shown in FIG. 1 the first embodiment of an apparatus according to the present invention, comprising a photosensitive material holder 1 having a curvature of a part of a circular tube which is cut away by a plane which is parallel with a central axis of the circular tube. A photosensitive material 2 such as a photographing film for plate making, to be scanned by a light beam, is mounted on the inner cylindrical surface of the photosensitive material holder 1.

A rotary mirror 3 with a reflecting surface 3a having a similar length to that of the holder 1 is rotatably mounted to L-shaped support members along the central axis of the curvature of the holder 1 and is rotatable around it, the reflecting surface 3a of the rotary mirror 3 being parallel with the central axis of the holder 1. A fixed mirror 4 having the same length as the rotary mirror 3 is mounted to the support members below the rotary mirror 3 in parallel therewith, and the reflecting surface of the fixed mirror 4 is inclined so as to reflect the incident light beam to the rotary mirror 3.

The rotary mirror 3 is rotated at a certain speed by a motor 5 via an endless belt 6 and a pulley mounted to a rotating shaft of the rotary mirror 3, and a rotary encoder 7 is coaxially mounted thereto.

A screw rod 8 is rotatably mounted to the support members in front of the holder 1 in parallel with the central axis of the holder 1. The screw rod 8 is rotated at a certain speed by a motor 9 via gears 10 and 11 secured to the shafts of the motor 9 and the screw rod 8. A pair of guide rods 15 are mounted to the support members in parallel with the screw rod 8.

A light beam head 12 on which a right-angle prism 13 and a focusing lens 14 are mounted, is moved by the screw rod 8 in the direction parallel with the central axis of the holder 1 along the guide rods 15.

A laser light beam B which is modulated depending on a picture signal, is incident to the right-angle prism 13 from the direction parallel with the central axis of the holder 1, and then the light beam is reflected by the prism 13 wherein the total internal reflection of the light is carried out, and then goes towards the fixed mirror 4 through the lens 14. The light beam converged by the lens 14 is reflected by the fixed mirror 4 and then is incident to the rotary mirror 3 perpendicular to the rotating axis of the rotary mirror 3. Then, the light beam reflected by the rotary mirror 3 is focused at a focal point f on the photosensitive material 2 mounted to the holder 1.

The scanning of the photosensitive material 2 is performed in the directions of the holder's curvature and the holder's axis, i.e. the vertical and the horizontal directions of FIG. 1, by rotating the rotary mirror 3 around its rotating axis by means of the motor 5, as indicated by an arrow, and moving the light beam head 12 in the direction of the rotating axis by means of the motor 9, respectively.

In this apparatus, the rotary mirror 3 may be bifacial mirror and the moving speed of the light beam head 12 may be double, thereby reducing the scanning time to half, while the reproducing accuracy of the picture is maintained in the same level.

When the rotary mirror 3 having one reflecting surface is used, the surface of the reflecting surface of the mirror 3 preferably coincident with the central axis of the holder 1.

Figure 2:
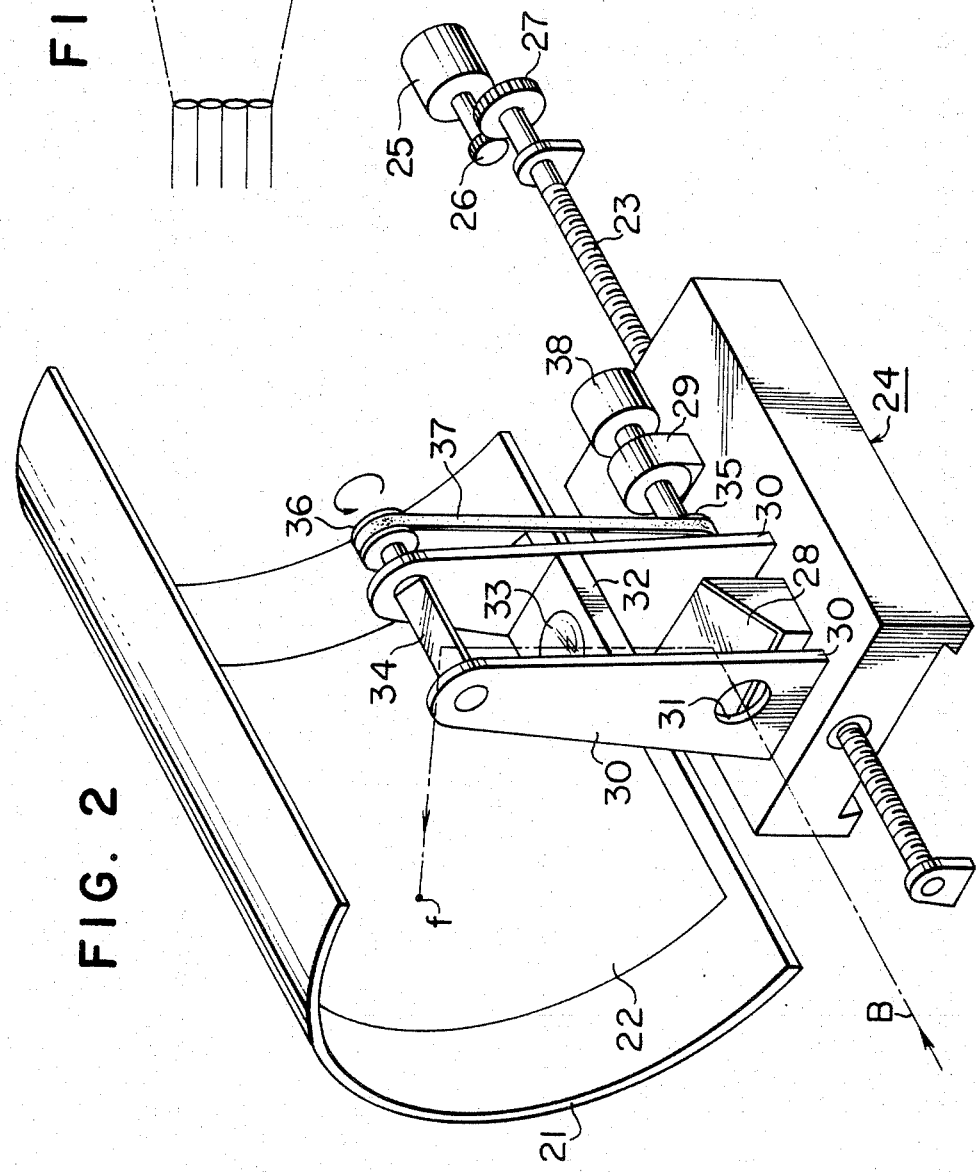
FIG. 2 is a fragmentary perspective view of the second embodiment of an apparatus according to the present invention.

In FIG. 2 there is shown the second embodiment of the apparatus according to the present invention. A photosensitive material holder 21 has the same construction and functions as the one 1 of the first embodiment of FIG. 1, and a photosensitive material 22 of the same type as that of FIG. 1 is mounted to the holder 21.

In front of the holder 21, a screw rod 23 having the same functions as the screw rod 8 of FIG. 1 is rotatably supported by a pair of bearing members in parallel with the central axis of the holder 21. A light beam head 24 corresponding to the one 12 of the first embodiment described above is movably mounted onto the screw rod 23 and is moved at a certain speed along the screw rod 23 and a guide member (not shown) by rotating the screw rod 23 by means of a motor 25 via gears 26 and 27 attached to their shafts.

On the upper surface of the light beam head 24, a fixed mirror 28 and a motor 29 corresponding to the right-angle prism 13 and the motor 5 of the first embodiment are mounted and a pair of support plates 30 are set upright in the left and the right sides of the fixed mirror 28. In the left side support plate 30 a window hole 31 through which the light beam B is passed, is formed. A lens mount 32 on which a focusing lens 33 is mounted, is positioned between the support plates 30 in their middle heights. A rotary mirror 34 having a short length corresponding to the rotary mirror 3 of the first embodiment is rotatably mounted between the support plates 30 in their top portions so as to extend along the central axis of the curvature of the holder 21. The rotary mirror 34 is rotated at a certain speed by the motor 29 via pulleys 35 and 36 mounted to their shafts and an endless belt 37 extended therebetween, as shown by an arrow. A rotary encoder 38 is coaxially mounted to the motor 29.

The laser light beam B is incident to the fixed mirror 28 from the direction parallel with the central axis of the holder 21, and then the light beam is reflected upwards by the fixed mirror 28, and goes to the rotary mirror 34 through the lens 33. The light beam converged by the lens 33 is incident to the rotary mirror 34 perpendicular to the rotating axis of the rotary mirror 34. Then, the light beam reflected by the rotary mirror 34 is focused at the focal point f of the photosensitive material 22 mounted to the holder 21.

The scanning of the photosensitive material 22 is performed in the same manner as the first embodiment described above by rotating the rotary mirror 34 by means of the motor 29 and moving the light beam head 24 together with the rotary mirror 34 by means of the motor 25, respectively. Consequently, the same results and advantages as the first embodiment are obtained.

Figure 3:
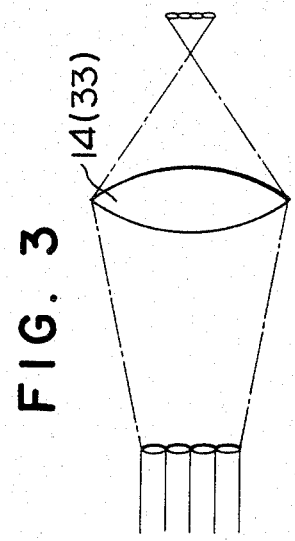
FIG. 3 is a schematic view of a plurality of light beams aligned in parallel along a line, passing through a lens.

In these embodiments described above, as shown in FIG. 3, a plurality of light beams which are aligned along the central axis of the holder 1 or 21 by using an optical element for a laser guide and the like, can be incident to the rotary mirror 3 or 34 so that the plurality of light beams aligned horizontary in FIG. 2 may scan the photosensitive material 2 or 22 in a single operation. In this case, the scanning time can be reduced considerably, accordingly.

Further, when the bifacial rotary mirror is used, two light beams which are separated at the distance of the one scanning line pitch each other along the central axis of the holder 1 or 21 and are incident to the bifacial mirror from the opposite directions so that each light beam may scan alternate scanning lines independently. In this embodiment, the scanning time can be saved.

Figure 4:
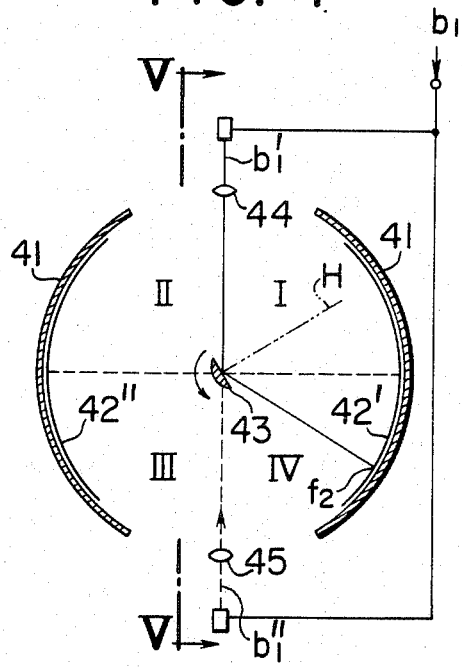
FIG. 4 is a central longitudinal cross-section of the third embodiment of an apparatus according to the present invention.
Figure 5:
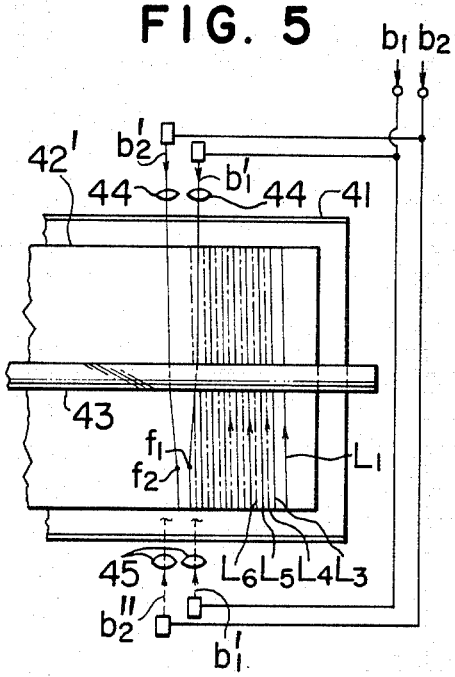
FIG. 5 is a fragmentary view seen from a side, taken along the line V—V of FIG. 4.

In FIGS. 4 and 5, there is schematically shown the third embodiment of the present invention.

A pair of photosensitive material holders 41, each having the same construction and functions as the holder 1 shown in FIG. 1, are arranged so that their surfaces may be on a cylindrical periphery of a circular pipe, and so that the two holders 41 may be positioned symmetrically with respect to a central vertical plane.

The photosensitive materials 42' and 42" for recording are mounted onto the inner surfaces of the holders 41 so as to be symmetric with respect to the central vertical plane. A rotary mirror 43 having one reflecting surface is rotatably arranged in the holders 41 so that the reflecting surface of the mirror 43 may extend on or along the central axis of the holders 41.

Two focusing lenses 44 and 45 are arranged in the opposite symmetric top and bottom portions with respect to the rotary mirror 43. Each lens 44 or 45 is moved one pitch per a quater rotation of the rotary mirror 43 in the direction parallel with the central axis of the holders 41 by light beam heads (not shown) in the same manner as the first or the second embodiment shown in FIGS. 1 or 2.

Figure 6:
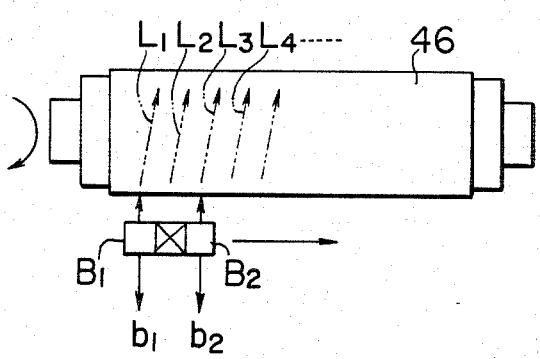
FIG. 6 is a schematic elevational view of one embodiment of an original picture scanning means which is used in the third embodiment of the present invention.

As shown in FIG. 6, $b_1$ and $b_2$ show picture signals obtained by scanning alternately two of scanning lines $L_1$, $L_2$, $L_3$, $L_4$, ... of an original picture 46 by a pair of pickup heads $B_1$ and $B_2$ in the same time. The pickup heads $B_1$ and $B_2$ are adapted to be moved in the direction of the picture cylinder's axis in synchronization with the movements of the light beam heads, so as to scan each scanning line per a quater rotation of the rotary mirror 43.

In FIGS. 4 and 5, $b_1'$ and $b_1''$ mean laser light beams modulated by the picture signal $b_1$ and $b_2'$ and $b_2''$ mean laser light beams modulated by the picture signal $b_2$. Therefore, the beams $b_1'$ and $b_1''$ are the same and the beams $b_2'$ and $b_2''$ are the same.

The light beams $b_1'$ and $b_2'$ shown by solid lines are incident to the rotary mirror 43 from the top through the focusing lenses 44 or a common focusing lens 44, and then the light beams reflected by the rotary mirror 43 are focused on the photosensitive material 43' or 42" at focal point $f_1$ or $f_2$ corresponding to the scanning points of the original picture 46.

On the other hand, the light beams $b_1''$ and $b_2''$ shown by broken lines are incident to the rotary mirror 43 from the bottom through the focusing lenses 45 or a common focusing lens 45, and then the light beams reflected by the rotary mirror 43 are focused on the photosensitive material 42' or 42" in the same manner as described above.

The operation of the apparatus of the present invention will be described in connection with FIG. 7.

In FIG. 7 there are shown the scanning lines $L_1$, $L_2$, ... of the original picture in the upper part; positions of perpendiculars H of the reflecting surface of the rotary mirror 43, i.e. the positions of the pickup heads $B_1$ and $B_2$ every quater rotation period I, II, III or IV of the rotary mirror 43 in the middle part; and the scanning lines recorded on the photosensitive materials 42' and 42" corresponding to those $L_1$, $L_2$, ... of the original picture together with quater rotation periods I-IV of the rotary mirror 43 and the upper and the lower recording light beams $b_1'$, $b_1''$, $b_2'$ and $b_2''$ in the lower part.

In the lower part of FIG. 7, when the scanning is performed by the upper light beams $b_1'$ and $b_2'$, it is shown by the arrow of a solid line together with its scanning direction, and when the scanning is performed by the lower light beams $b_1''$ and $b_2''$, it is shown by the arrow of a broken line together with its scanning direction.

As shown in FIG. 4, the position of the perpendicular H of the reflecting surface of the rotary mirror 43 is varied continuously from the first quadrant I to the fourth quadrant IV and then the first quadrant I repeatedly.

Now, as shown in FIG. 4, when the perpendicular H of the mirror 43 is in the first quadrant I, as shown in the position I of the middle part of FIG. 7, the pickup heads $B_1$ and $B_2$ scan the scanning lines $L_1$ and $L_3$ of the picture 46 to output the picture signals $b_1$ and $b_2$ by which the light beams $b_1'$, $b_1''$, $b_2'$ and $b_2''$ are modulated. However, the lower light beams $b_1''$ and $b_2''$ hit the back side of the rotary mirror 43 (see FIG. 4), and thus cannot record the photosensitive materials 42' and 42", and therefore only the upper light beams $b_1'$ and $b_2'$ record alternately the scanning lines $L_1$ and $L_3$ corresponding to the scanning lines $L_1$ and $L_3$ of the picture 46, onto the photosensitive material 42' from the lower part to the upper part.

Then, when the perpendicular H of the mirror 43 is moved in the second quadrant II, as shown in the position II of the middle part of FIG. 7, the pickup heads $B_1$ and $B_2$ move one pitch and scan the scanning lines $L_2$ and $L_4$, and the upper light beams $b_1'$ and $b_2'$ record alternately the scanning lines $L_2$ and $L_4$ of corresponding to the scanning lines $L_2$ and $L_4$ of the picture 46, onto the photosensitive material 42" from the upper part to the lower part.

Next, when the perpendicular H of the mirror 43 is moved in the third quadrant III, as shown in the position III of the middle part of FIG. 7, the pickup heads $B_1$ and $B_2$ further move one pitch and scan the scanning lines $L_3$ and $L_5$, but the upper light beams $b_1'$ and $b_2'$ hit the back side of the rotary mirror 43. Hence, only the light beams $b_1''$ and $b_2''$ record alternately the scanning lines $L_3$ and $L_5$ corresponding to the scanning lines $L_3$ and $L_5$ of the picture 46 onto the photosensitive material 42" from the upper part to the lower part.

Then, when the perpendicular H of the mirror 43 is moved into the fourth quadrant IV, as shown in the position IV of the middle part of FIG. 7, the pickup heads $B_1$ and $B_2$ move one more pitch and scan the scanning lines $L_4$ and $L_6$, and the light beams $b_1''$ and $b_2''$ record alternately the scanning lines $L_4$ and $L_6$ corresponding to the scanning lines $L_4$ and $L_6$ of the picture 46 onto the photosensitive material 42' from the lower part to the upper part, thereby completing the first cycle of the scanning while the rotary mirror 43 is rotated one time. Then, the second cycle of the scanning is carried out in the same manner as above, thereby recording consecutively the scanning lines $L_5$ and $L_7$; $L_6$ and $L_8$; $L_7$ and $L_9$; and then $L_8$ and $L_{10}$ on the photosensitive materials 42' and 42", in the same manner as the first cycle described above. Then, the same operation is repeatedly carried out for the following cycles.

From the above description, it is readily understood that the pickup heads $B_1$ and $B_2$ move four pitches every one cycle of the rotary mirror 43, and that the photosensitive materials 42' and 42" are recorded in the same time: i.e. the photosensitive material 42' by alternately scanning the scanning lines of odd numbers and even numbers by means of the upper light beams $b_1'$ and $b_2'$ and the lower light bems $b_1''$ and $b_2''$, respectively, except the second scanning line $L_2$; the photosensitive material 42" by alternately scanning the scanning lines of even numbers and the odd numbers by means of the upper light beams $b_1'$ and $b_2'$ and the lower light beams $b_1''$ and $b_2''$, respectively, except the first scanning line $L_1$, as shown in the lower part of FIG. 7, thereby recording the picture image faithfully on the photosensitive materials 42' and 42".

In this case, the scanning lines $L_2$ and $L_1$ cannot be recorded on the photosensitive materials 42' and 42", as described above, but, in practice, such lackings occurs only the first quater period of the first cycle of the rotary mirror 43, and thus, when the scanning of the plurality of cycles is continuously performed, such an inconvenience can be negligible.

In this embodiment, the unnecessary light beams which hit the back side of the rotary mirror should not be generated or should be completely shielded from the photosensitive materials.

In the third embodiment described above, the recording of the picture image by scanning can be carried out by using one picture signal and a delay picture signal obtained by delaying the picture signal by the time corresponding to the two pitched of the scanning lines. For example, the original picture is scanned by using a pickup head to obtain picture signals which are once stored in a memory, and one picture signal now picked up by the pickup head and a delay picture signal delayed by the two pitches of the scanning lines the memory, read out of the memory, are used as the picture signals $b_1$ and $b_2$ of the third embodiment described above.

The fourth embodiment of the present invention is described in connection with FIG. 8. This is carried out in the similar manner to the third embodiment, except that three picture signals $b_1$, $b_2$ and $b_3$ which are picked up by scanning three adjacent scanning lines such as $L_1$, $L_2$ and $L_3$ of the original picture by means of three pickup heads $B_1$, $B_2$ and $B_3$, are used for modulating the six laser light beams in order to obtain the modulated light beams $b_1'$, $b_1''$, $b_2'$, $b_2''$, $b_3'$ and $b_3''$ in the similar manner to the third embodiment.

In FIG. 8 there are shown the scanning lines $L_1$, $L_2$, ... of the original picture in the upper part; the positions of the pickup heads $B_1$, $B_2$ and $B_3$ every quater rotation period I, II, III or IV of the rotary mirror 43 with respect to the positions of the perpendicular H of the reflecting surface of the rotary mirror 43 in the middle part; and the scanning lines recorded on the photosensitive materials 42' and 42" corresponding to those $L_1$, $L_2$, ... of the original picture together with quater rotation periods I-IV of the rotary mirror 43 and the upper and the lower recording light beams $b_1'$, $b_1''$, $b_2'$, $b_2''$, $b_3'$, $b_3''$ in the lower part.

In this embodiment, the second pickup head $B_2$ is always actuated, and the first and the third pickup heads $B_1$ and $B_3$ are alternately actuated every one pitch of the scanning line or every the quater rotation period of the rotary mirror 43. The upper light beams $b_1'$, $b_2'$ and $b_3'$ and the lower light beams $b_1''$, $b_2''$ and $b_3''$, modulated by the picture signals $b_1$, $b_2$ and $b_3$ picked up by the pickup heads $B_1$, $B_2$ and $B_3$, respectively, are incident to the rotary mirror 43 from the top and the bottom portions through the upper and the lower focusing lenses 44 and 45, in the same manner as the third embodiment of the present invention.

In FIG. 8, X marks of the middle part indicate the deactivations of the first and the third pickup head $B_1$ or $B_3$.

In this embodiment, the operation of the record of the picture image onto the photosensitive materials 42' and 42" is performed, in the similar manner to the third embodiment of the present invention, thereby reproducing faithfully the picture image onto the photosensitive materials 42' and 42".

In the embodiments described above, although the present invention has been explained in connection with the recording of the reproduction image or the photosensitive material by scanning, however, of course, the present invention can be utilized in the scanning of the original picture by somewhat changing or modifying in the embodiments described above.

Although the present invention has been described in terms of preferred embodiments thereof with reference to the accompanying drawings, however, various changes and modifications can be made by those skilled in the art without departing from the scope of the present invention.

For example, the photosensitive material holder 1, 21 or 41 may be made of a transparent material and a photosensitive material is mounted onto the outer surface thereof.

What is claimed is:

1. A method of scanning at least one object comprising the steps of:
   mounting an object to be scanned on the cylindrically curved interior surface of a stationary object holder, said surface having an elongated central axis;
   rotating an elongated mirror having at least one reflective surface along the central axis of the holder;
   disposing an elongated stationary mirror parallel to the rotating mirror having a reflective surface directed to deflect a light beam onto the reflective surface of the rotating mirror;
   projecting a narrow light beam perpendicular to said axis onto the reflective surface of the stationary mirror which is deflected onto the reflective surface of the rotating mirror and then onto the object in the holder; and
   translating the light beam along an axis parallel to the stationary mirror to scan the object.

2. A method according to claim 1 in which the rotating mirror contains two reflective surfaces.

3. A method according to claim 1 in which a plurality of cylindrically curved object holders are disposed on said central, elongated axis and an object to be scanned is mounted on each cylindrically curved, interior surface of said object holders.

4. A method according to claim 3 in which the rotating mirror contains two reflective surfaces.

5. An apparatus for scanning an object in combination:
   an elongated stationary object holder having an elongated, cylindrically curved surface for mounting an object to be scanned;
   means mounting said holder with said surface positioned along a central axis;
   a first rotatable mirror having at least one reflective surface mounted along said central axis;
   means for rotating the first mirror connected to an end of the first mirror;
   an elongated stationary second mirror disposed along an axis parallel to the axis of the first mirror having a reflective surface positioned to project a light beam onto the reflective surface of the first mirror;

carriage means for mounting the light beam projecting means; and means for translating the carriage means along an axis parallel to the axis of the second mirror whereby said light beam is reflected from the reflective surface of the second mirror onto the reflective surface of the first mirror and scans the surface of an object in the object holder.

6. An apparatus according to claim 5 in which a plurality of stationary, cylindrically curved object holders are disposed with their centers of curvature coincident with said central axis.

7. An apparatus according to claim 6 in which said first mirror contains two reflective surfaces.

* * * * *